US012662778B2

(12) United States Patent
Kim et al.

(10) Patent No.: US 12,662,778 B2
(45) Date of Patent: Jun. 23, 2026

(54) ASPHALT REINFORCEMENT COMPRISING ASPHALT EMULSION-IMPREGNATED NONWOVEN FABRIC AND METHOD OF REPAIRING PAVEMENT USING THE SAME

(71) Applicants: ESG Industry Co., Ltd., Daejeon (KR); ESG Construction. Co. Ltd., Gyeryong-si (KR); A-ONE YOO HWA, Ulsan (KR)

(72) Inventors: Hyeong Su Kim, Daejeon (KR); Hyong Ho Nam, Daejeon (KR); Sung Hoon Shim, Ulsan (KR); Hyoung Dong Ko, Gyeongju-si (KR)

(73) Assignees: ESG INDUSTRY CO., LTD., Daejeon (KR); ESG CONSTRUCTION. CO. LTD., Gyeryong-si (KR); A-ONE YOO HWA, Ulsan (KR)

( * ) Notice: Subject to any disclaimer, the term of this patent is extended or adjusted under 35 U.S.C. 154(b) by 888 days.

(21) Appl. No.: 17/990,506

(22) Filed: Nov. 18, 2022

(65) Prior Publication Data

US 2023/0088563 A1      Mar. 23, 2023

Related U.S. Application Data

(63) Continuation of application No. PCT/KR2021/016614, filed on Nov. 15, 2021.

(30) Foreign Application Priority Data

Jun. 3, 2021      (KR) ........................ 10-2021-0072016

(51) Int. Cl.
*E01C 11/16*          (2006.01)
*B32B 5/02*          (2006.01)
(Continued)

(52) U.S. Cl.
CPC ............ *E01C 11/165* (2013.01); *B32B 5/022* (2013.01); *B32B 5/028* (2013.01); *B32B 11/10* (2013.01);
(Continued)

(58) Field of Classification Search
CPC ......... E01C 11/165; E01C 11/16; E01C 7/187
See application file for complete search history.

(56) References Cited

U.S. PATENT DOCUMENTS 5,829,914 A * 11/1998 Wells .................... E01C 19/238
                                                                      404/70
5,836,715 A * 11/1998 Hendrix .................. E01C 11/16
                                                                      404/70
(Continued)

FOREIGN PATENT DOCUMENTS

KR        20050102469 A  * 10/2005  .............. E01C 7/26
KR        101336333        12/2013
(Continued)

*Primary Examiner* — Abigail A Risic
(74) *Attorney, Agent, or Firm* — CANTOR COLBURN LLP

(57) ABSTRACT

Provided is an asphalt reinforcement. The asphalt reinforcement includes: a reinforcing fiber layer having a plurality of holes formed therein; a film layer being breathable or non-breathable and having at least one resin selected from the group consisting of polypropylene, polyethylene, ethylene vinyl acetate, polyethylene elastomers, polypropylene elastomers, polybutene, and thermoplastic polyurethane, and has a melting point of 90° C. to 130° C.; and a nonwoven fabric layer disposed between the reinforcing fiber layer and the film layer, impregnated with an asphalt emulsion, and having a melting point of 50° C. to 130° C. The asphalt emulsion is prepared by mixing a first emulsion and a second emulsion and has a viscosity of 40 to 200 cP. The first emulsion contains modified asphalt, a curing agent, an anti-stripping agent, and petroleum resin, and the second
(Continued)

emulsion contains latex, a fatty acid amine salt, calcium chloride, hydrochloric acid, a thickener, and water.

12 Claims, 2 Drawing Sheets

(51) Int. Cl.

| | | |
|---|---|---|
| *B32B 11/10* | (2006.01) | |
| *B32B 27/12* | (2006.01) | |
| *B32B 27/18* | (2006.01) | |
| *B32B 27/32* | (2006.01) | |
| *B32B 27/36* | (2006.01) | |

(52) U.S. Cl.

CPC .............. *B32B 27/12* (2013.01); *B32B 27/18* (2013.01); *B32B 27/32* (2013.01); *B32B 27/36* (2013.01); *B32B 2262/0253* (2013.01); *B32B 2262/0269* (2013.01); *B32B 2264/10* (2013.01); *B32B 2307/54* (2013.01)

(56) References Cited

U.S. PATENT DOCUMENTS

| | | | | |
|---|---|---|---|---|
| 2003/0086762 | A1* | 5/2003 | Oka ...................... | E01C 11/165 |
| | | | | 404/18 |
| 2005/0009428 | A1* | 1/2005 | Porter .................... | C04B 14/42 |
| | | | | 442/72 |
| 2016/0362849 | A1* | 12/2016 | Kim ................... | C08L 23/0815 |
| 2017/0167085 | A1* | 6/2017 | Li ......................... | E01C 11/005 |
| 2019/0169802 | A1* | 6/2019 | Dong .................... | D04H 3/045 |
| 2023/0228085 | A1* | 7/2023 | Blackburn .......... | B28B 23/0006 |
| | | | | 442/42 |

FOREIGN PATENT DOCUMENTS

| | | |
|---|---|---|
| KR | 101427375 | 8/2014 |
| KR | 20170033591 | 3/2017 |
| KR | 20170111650 | 10/2017 |
| KR | 20170111652 | 10/2017 |
| KR | 101879347 | 7/2018 |
| KR | 101906757 | 12/2018 |
| KR | 101994155 | 6/2019 |

* cited by examiner

ASPHALT REINFORCEMENT COMPRISING ASPHALT EMULSION-IMPREGNATED NONWOVEN FABRIC AND METHOD OF REPAIRING PAVEMENT USING THE SAME

TECHNICAL FIELD

The present invention relates to an asphalt reinforcement, and more particularly, to an asphalt reinforcement, which is applicable to asphalt pavement without tack coat application and curing processes, and a method of repairing asphalt pavement using the same.

BACKGROUND ART

Asphalt is a very complex mixture of thousands of high molecular hydrocarbon compounds, including organic compounds and trace amounts of inorganic compounds, and is also called asphalt concrete or Ascon. When crushed stone, sand, stone powder, or the like is mixed with 5 to 6% of asphalt and compacted, it becomes hard and sticky and may be used as a base material for road pavement or asphalt tiles.

However, due to long-term use, traffic load, ground behavior, freezing, thawing, and penetration of chlorides used to eliminate freezing, the asphalt pavement surface undergoes vertical or horizontal deformation, and cracks or potholes occur. In this case, a problem arises in that huge maintenance and repair costs are incurred.

In order to prevent reflective cracking or suppress plastic deformation during asphalt construction, a process of installing an asphalt reinforcement including reinforcing fibers composed of carbon fibers, glass fibers, aramid fibers, polyester fibers or the like is applied. Since the reinforcing fibers have both elasticity and ductility, they serve to extend the life of asphalt pavement when applied to asphalt pavement construction.

Various asphalt reinforcements that extend the life of asphalt pavement have been proposed. Korean Patent No. 10-1336333 discloses a reinforcement including a nonwoven fabric 20 made of polypropylene and a fiber grid network 10 provided on the nonwoven fabric.

In addition, Korean Patent No. 10-1427375 discloses an asphalt reinforcement including a breathable polyethylene film, a reinforcing fiber layer having a plurality of holes formed therein, and an adhesive layer between the film and the reinforcing fiber layer.

According to the "Road Pavement Maintenance Practice Manual (2013)" published by the Ministry of Land, Infrastructure and Transport, asphalt reinforcement is applied in the process of repairing asphalt pavement, and in this case, the asphalt or concrete base to be repaired is cleaned, and then a tack coat is applied thereto and cured for a certain period of time, followed by application of asphalt reinforcement. Subsequently, an asphalt paving and compaction process is performed. According to "KCS 44 50 10:2016 Standard Specification for Asphalt Concrete Pavement Construction" published by the Ministry of Land, Infrastructure and Transport, the tack coat is applied in order to improve the adhesion of an asphalt mixture to an existing asphalt layer, cement concrete slab, or concrete pavement. The application of the tack coat should be performed by a process that increases the adhesion between the upper layer of existing pavement (base layer) and a surface layer (new asphalt layer), prevents water or foreign substances from penetrating into the base layer, gives waterproof properties, and increases the strength of pavement by increasing cohesion. However, a curing time of 1 to 2 hours or more after application of the tack layer is required, and if paving is performed before completion of curing of the tack coat, the tack coat will be damaged due to the movement of a dump truck or paving equipment on the tack coat, and as a result, the durability of the asphalt pavement will be degraded due to insufficient adhesion between the new pavement layer and the existing pavement layer, thereby reducing the service life of the road.

DISCLOSURE

Technical Problem

The present invention has been made in order to solve the above-described problems occurring when applying the tack coat in a conventional art, and an object of the present invention is to provide a tack coat-integrated asphalt reinforcement, which is applicable directly after cleaning of the base surface without the conventional tack coat application and curing processes, and a method of repairing asphalt pavement using the same.

Technical Solution

The above object is accomplished by an asphalt reinforcement including: a reinforcing fiber layer having a plurality of holes formed therein; a film layer, which is breathable or non-breathable, includes at least one resin selected from the group consisting of polypropylene, polyethylene, ethylene vinyl acetate, polyethylene elastomers, polypropylene elastomers, polybutene, and thermoplastic polyurethane, and has a melting point of 90° C. to 130° C.; and a nonwoven fabric layer, which is disposed between the reinforcing fiber layer and the film layer, is impregnated with an asphalt emulsion, and has a melting point of 50° C. to 130° C., wherein the asphalt emulsion is prepared by mixing a first emulsion and a second emulsion and has a viscosity of 40 to 200 cP, wherein the first emulsion contains modified asphalt, a curing agent, an anti-stripping agent, and petroleum resin, and the second emulsion contains latex, a fatty acid amine salt, calcium chloride, hydrochloric acid, a thickener, and water.

Preferably, the nonwoven fabric layer may be impregnated with the asphalt emulsion in an amount of 50 to 650 g/m².

Preferably, the asphalt emulsion may contain, based on the total weight of the emulsion, 60 to 70 wt % of the modified asphalt, 1.0 to 5.0 wt % of the curing agent, 0.01 to 0.1 wt % of the anti-stripping agent, 0.1 to 5.0 wt % of petroleum resin, 5.0 to 10.0 wt % of latex, 0.1 to 2.0 wt % of the fatty acid amine salt, 0.1 to 2.0 wt % of calcium chloride, 0.1 to 1.0 wt % of hydrochloric acid, 1.0 to 10.0 wt % of the thickener, and 20 to 30 wt % of water.

Preferably, the film layer may have a basis weight of 10 to 50 g/m², and the nonwoven fabric layer may include polyethylene spunbond nonwoven fabric, polyethylene melt-blown nonwoven fabric, copolyamide TBCW nonwoven fabric, copolyamide melt-blown nonwoven fabric, polypropylene TBCW nonwoven fabric, polypropylene melt-blown nonwoven fabric, ethylene vinyl acetate TBCW nonwoven fabric, or ethylene vinyl acetate melt-blown nonwoven fabric, and may have a basis weight of 10 to 50 g/m².

Preferably, when the film layer is breathable, it may include at least one resin selected from the group consisting of polypropylene, polyethylene, ethylene vinyl acetate, polyethylene elastomers, polypropylene elastomers, polybutene, and thermoplastic polyurethane, and at least one inorganic material selected from the group consisting of calcium carbonate, magnesium carbonate, magnesium sulfate, barium sulfate, magnesium sulfate, zeolite, talc, kaolin, zinc oxide, titanium dioxide, alumina, aluminum hydroxide, magnesium hydroxide, diatomaceous earth, and clay.

Preferably, the reinforcing fiber layer may be a grid network including at least one fiber selected from the group consisting of carbon fibers, glass fibers, basalt fibers, Kevlar fibers, aramid fibers, and polyester fibers.

Advantageous Effects

The asphalt reinforcement according to the present invention is easily applied, allows omitting the tack coat application process or curing process, and may repair asphalt pavement in a simple and convenient manner. In addition, the use of the asphalt reinforcement according to the present invention may increase the adhesion between the lower asphalt layer (intermediate layer or concrete base layer) and the upper layer (asphalt surface layer or intermediate layer) of pavement without tack coat application, and increase the strength of the reinforcement.

MODE FOR INVENTION

Unless otherwise defined, all technical terms used in the present invention have the same meanings as commonly understood by those skilled in the art to which the present invention pertains. In addition, although preferred methods or samples are described herein, those similar or equivalent thereto are also within the scope of the present invention.

The term "about" refers to an amount, level, value, number, frequency, percentage, dimension, size, amount, weight or length that varies by as much as 30, 25, 20, 15, 10, 9, 8, 7, 6, 5, 4, 3, 2 or 1% to a reference amount, level, value, number, frequency, percentage, dimension, size, amount, weight or length.

Throughout the present specification, unless the context requires otherwise, the words "includes," "include," and "including" will be understood to imply the inclusion of a stated step or element or group of steps or elements but not the exclusion of any other step or element or group of steps or elements.

Figure 1:
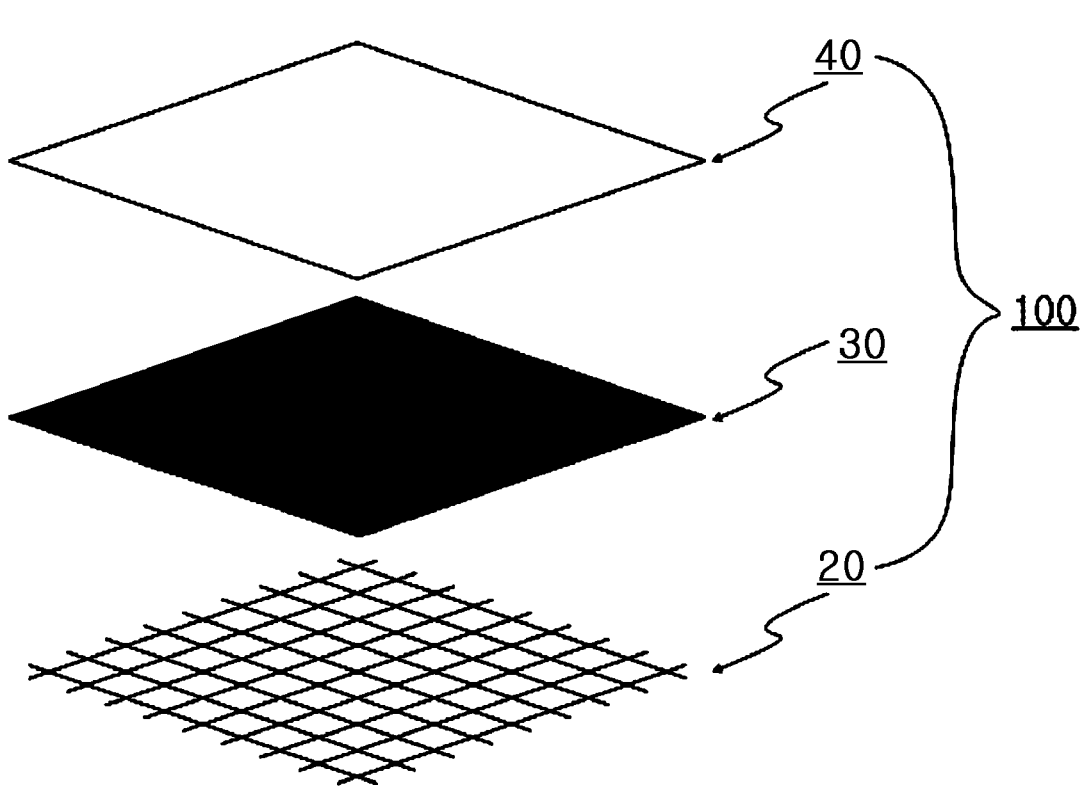
FIG. 1 is an exploded perspective view of an asphalt reinforcement according to the present invention.
Figure 2:
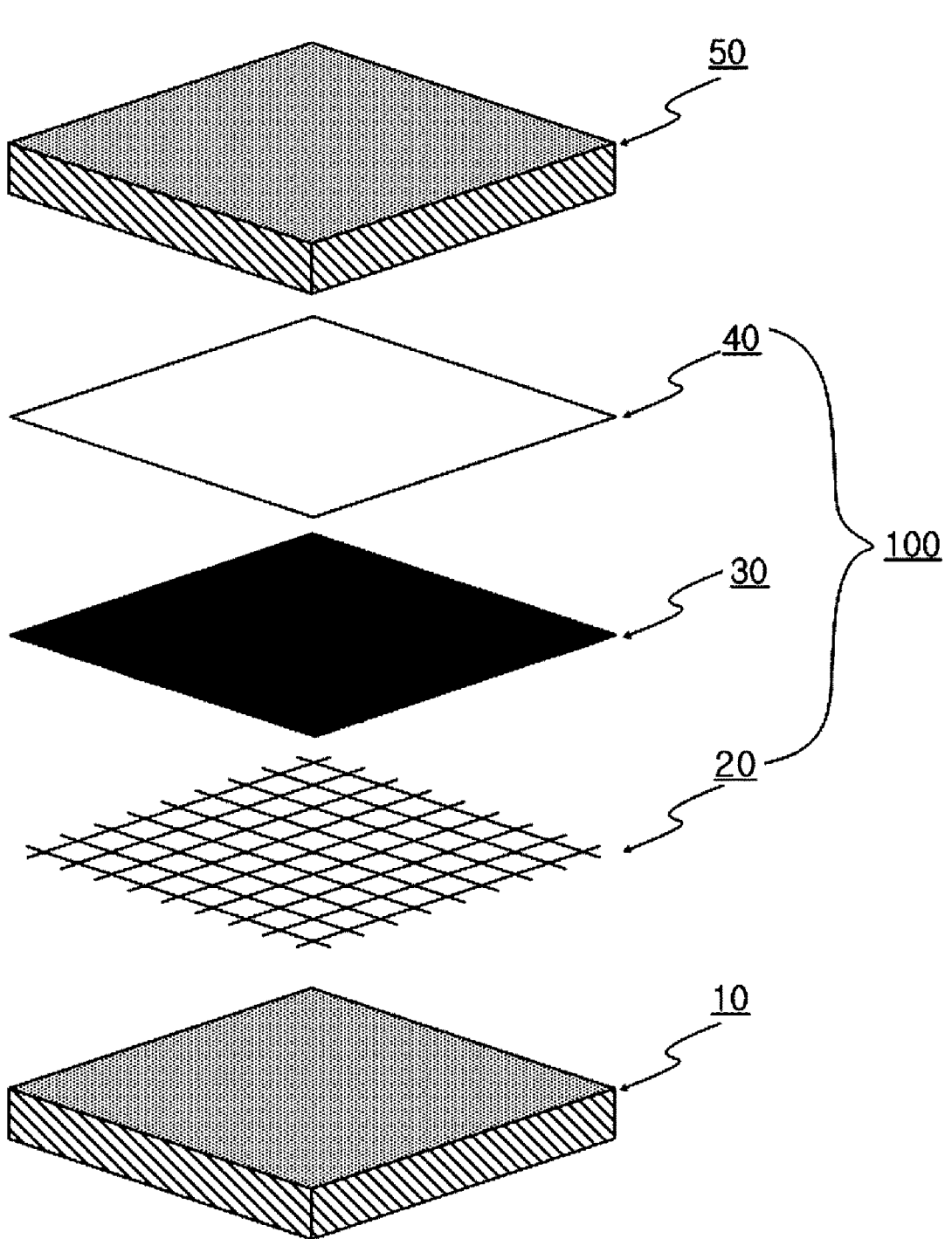
FIG. 2 is an exploded perspective view schematically showing that the asphalt reinforcement according to the present invention is attached to an asphalt or concrete base.

The present invention relates to an asphalt reinforcement. FIG. 1 is an exploded perspective view of the asphalt reinforcement according to the present invention. Referring to FIG. 1, the asphalt reinforcement 100 includes: a reinforcing fiber layer 20 having a plurality of holes formed therein; a film layer 40 composed of a breathable or non-breathable polyethylene film; and a nonwoven fabric layer 30 disposed between the reinforcing fiber layer and the film layer and including a nonwoven fabric impregnated with an asphalt emulsion.

The reinforcing fiber layer 20 may be a grid network including at least one fiber selected from the group consisting of carbon fibers, glass fibers, basalt fibers, Kevlar fibers, aramid fibers, and polyester fibers.

More preferably, the reinforcing fiber layer may include at least one selected from the group consisting of glass fibers, Kevlar fibers, and carbon fibers. The reinforcing fiber layer of the present invention has excellent elastic modulus and tensile strength, and thus may effectively prevent reflective cracking.

The reinforcing fiber layer 20 may include holes in order to ensure the adhesion between a base surface and new asphalt pavement. The holes may be formed through post-processing such as a needle-punch method depending on the specificity of the shape thereof. The size of the hole is preferably 3 mm to 50 mm, more preferably 10 mm to 30 mm, without being limited thereto.

According to an embodiment of the present invention, the film layer 40 may be breathable or non-breathable.

The film layer may be a film formed of a resin having a melting point of 50 to 130° C. Preferably, the film may include at least one resin selected from the group consisting of polypropylene, polyethylene, ethylene vinyl acetate, polyethylene elastomers (POE), polypropylene elastomers (POP), polybutene, and thermoplastic polyurethane. In general, polypropylene is known to have a melting point of 160° C., but in the present invention, a film having a melting point of 50 to 130° C. may be produced by selecting and using low-molecular-weight polypropylene or using homo-polypropylene. According to another embodiment of the present invention, the film layer may include a polyethylene resin having a melting point of 90 to 130° C.

According to an embodiment of the present invention, the film may be breathable or non-breathable.

When the film is a breathable film, it may be produced by mixing, based on the total weight of the film, 70 to 40 wt % of a resin having a melting point of 50 to 130° C. and 30 to 60 wt % of an inorganic material.

According to an embodiment of the present invention, the melting point of the film layer may be 50° C. to 150 C, preferably 90° C. to 130° C. Since the application temperature of asphalt is usually 120° C. or higher, the film layer of the present invention, which has a melting temperature lower than the application temperature of asphalt may be removed by the heat of the asphalt mixture in an asphalt paving process without using a separate heating device.

The inorganic material may be at least one selected from the group consisting of calcium carbonate, magnesium carbonate, magnesium sulfate, barium sulfate, calcium carbonate, magnesium carbonate, magnesium sulfate, barium sulfate, titanium oxide, alumina, aluminum hydroxide, magnesium hydroxide, diatomaceous earth, and clay. Preferably, an inorganic material having an average particle diameter of 1.1 to 4.0 μm, more preferably 1.5 to 3.0 μm, may be used. The inorganic material serves to provide breathability by forming pores. If the average particle diameter of the inorganic material is less than 1.1 μm, good breathability may not be obtained, and an overload may be applied to extrusion equipment during production, thereby shortening the life of the equipment. If the average particle diameter of the inorganic material is greater than 4.0 μm, defects in quality, such as tearing, hole generation, and strength reduction, may occur in the film production process.

When the breathable film is used, residual heat or gas generated in the asphalt emulsion curing process may pass through the cover, thereby shortening the curing time. However, when the breathable film is applied, the inorganic layer may limit the effect of increasing the adhesion of the asphalt emulsion layer. For this reason, it is preferable to use a breathable film having a reduced content of the inorganic material.

The film may be produced by a known film production method, such as a casting method, a T-die extrusion, or a blown extrusion method. More preferably, the film may be produced by a casting method.

According to an embodiment of the present invention, the surface of the film may be subjected to plasma surface treatment to increase the adhesion thereof to the asphalt emulsion. The plasma surface treatment may be performed using a known method.

In addition, the basis weight of the film layer may be 10 to 50 g/m². If the basis weight of the film layer is less than 10 g/m², the film may not function because it is easily torn by external forces such as wheels of construction equipment because of its low tensile strength. If the basis weight of the film layer is more than 50 g/m², phenomena such as tearing will not occur, but the film layer may act to reduce the viscosity and adhesion of the asphalt emulsion, thereby limiting the function of the asphalt emulsion.

In addition, the film layer according to the present invention may further include an antioxidant, an anti-blocking agent and a slip agent.

The nonwoven fabric layer may be formed using a nonwoven fabric including at least one resin selected from the group consisting of polypropylene, polyethylene, copolyamide, ethylene vinyl acetate, polyethylene elastomers (POE), polybutene, and thermoplastic polyurethane. According to one embodiment of the present invention, the melting point of the nonwoven layer may be 50 to 150° C., preferably 50 to 130° C. In general, polypropylene and polyamide have melting points of 160° C. and 220° C., respectively, but in the present invention, a nonwoven fabric having a melting point of 50 to 130° C. may be produced by selecting and using a low-molecular-weight polypropylene or a low-molecular-weight polyamide copolymer.

The nonwoven fabric may be spunbond nonwoven fabric, melt-blown nonwoven fabric, TBCW (through bonded carded web) nonwoven fabric, TABCW (through air bonded carded web) nonwoven fabric, or spunlace nonwoven fabric. Preferably, the nonwoven fabric may be melt-blown nonwoven fabric or TBCW nonwoven fabric.

Preferably, the nonwoven fabric layer may have a basis weight of 10 to 50 g/m². If the basis weight of the nonwoven fabric layer is less than 10 g/m², problems may arise in that the void space of the nonwoven fabric layer is narrow and thus the amount of asphalt emulsion absorbed into the nonwoven fabric layer is small, and the nonwoven fabric layer is torn by an external force because of its low tensile strength. If the basis weight of the nonwoven fabric is more than 50 g/m², the viscosity and adhesion of the asphalt emulsion may be reduced.

The nonwoven fabric layer is characterized in that it is impregnated with the asphalt emulsion.

The asphalt emulsion is prepared by mixing a first emulsion and a second emulsion using a colloid mill, wherein the first emulsion contains modified asphalt, a curing agent, an anti-stripping agent, and petroleum resin, and the second emulsion contains latex, a fatty acid amine salt, calcium chloride, hydrochloric acid, a thickener, and water.

According to an embodiment of the present invention, the asphalt emulsion may contain, based on the total weight of the emulsion, 60 to 70 wt % of the modified asphalt, 1.0 to 5.0 wt % of the curing agent, 0.01 to 0.1 wt % of the anti-stripping agent, 0.1 to 5.0 wt % of petroleum resin, 5.0 to 10.0 wt % of latex, 0.1 to 2.0 wt % of the fatty acid amine salt, 0.1 to 2.0 wt % of calcium chloride, 0.1 to 1.0 wt % of hydrochloric acid, 1.0 to 10.0 wt % of the thickener, and 20 to 30 wt % of water.

The curing agent may be a 1:1 (w/w) mixture of a glycerin compound and a resin acid. The curing agent is preferably contained in an amount of 1.0 to 5.0 wt % based on the total weight of the asphalt emulsion. If the content of the curing agent is less than 1.0 wt %, the curing time of the asphalt emulsion may increase, and thus the asphalt emulsion may not be cured in a step of producing the final reinforcement, thereby delaying the production process, and the production cost may be increased if an additional drying device is installed. If the content of the curing agent is more than 5.0 wt %, the curing time may be excessively shortened, and thus the emulsion may be cured in an impregnation bath before being impregnated into the nonwoven fabric, which may make continuous production difficult.

Preferably, the thickener may be methyl cellulose. The thickener is preferably contained in an amount of 1.0 to 10.0 wt % based on the total weight of the asphalt emulsion. If the content of the thickener is less than 1.0 wt %, the asphalt emulsion may not adhere well to not only an impregnating roll but also the nonwoven fabric due to its low viscosity. If the content of the thickener is more than 10.0 wt %, the viscosity of the asphalt emulsion will be excessively high, and thus it may be difficult to uniformly impregnate the nonwoven fabric with the asphalt emulsion, and product defects may increase.

Methods that may be used to impregnate the nonwoven fabric with the asphalt emulsion include a method of impregnating the nonwoven fabric by placing the asphalt emulsion in a bath and immersing the nonwoven fabric in the bath, a spray coating method, or a kiss roll method of impregnating a rotating roll with the asphalt emulsion and then applying the asphalt emulsion while allowing the rotating roll to pass over the nonwoven fabric.

According to an embodiment of the present invention, the nonwoven fabric layer is a nonwoven fabric impregnated with the asphalt emulsion in an amount of 50 to 650 g/m². According to an embodiment of the present invention, it is possible to use a nonwoven fabric impregnated with the asphalt emulsion in an amount of 50 to 350 g/m² for a non-cut surface and in an amount of 150 to 650 g/m² for a cut surface.

According to the "KCS 44 50 10:2016 Standard Specification for Asphalt Concrete Pavement Construction" published by the Ministry of Land, Infrastructure and Transport, the amount of bitumen (tack coat agent) applied during road paving is 0.3 to 0.6 l/m². Considering that conventional bitumen (tack coat agent) has a water content of about 50%, the actual solid content of the bitumen corresponds to 150 to 300 g/m².

The non-cut surface is the surface layer of concrete or asphalt road, and the surface layer of the road is clean and has a low porosity, and thus the tack coat is not lost after application thereof to the surface layer. Therefore, even if the tack coat agent is applied in an amount equal to the minimum value of the standard application amount range, the tack coat may sufficiently perform its function. Therefore, for the non-cut surface, a nonwoven fabric impregnated with the asphalt emulsion in an amount of 50 to 350 g/m² may be used.

In the case of the cut surface, dust or stone powder generated in the process of crushing a damaged surface layer may exist even after cleaning, and the loss of the tack coat agent by permeation is large because the base or intermediate layer has a high porosity. Therefore, in the present invention, a nonwoven fabric that is used for the cut surface is preferably impregnated with the asphalt emulsion in an amount of 150 to 650 g/m².

The nonwoven fabric layer impregnated with the asphalt emulsion may have a thickness of 0.1 to 5 mm.

The nonwoven fabric layer may be impregnated with the asphalt emulsion after it is laminated with the film layer. Alternatively, the nonwoven fabric layer may be impregnated with the asphalt emulsion before it is laminated with the film layer.

Lamination methods include a method of applying an adhesive to one surface of the film layer by a method such as liquid phase coating, microporous coating, slow coating, spray coating, or kiss roll coating, and then laminating the nonwoven fabric onto the film layer. The adhesive may be polyethylene, polypropylene, thermoplastic polyurethane, rubber such as SBS or SIS, EVA, POE, or the like, and the basis weight of the adhesive layer may be 0.5 to 15 g/m².

According to another embodiment, the film layer and the nonwoven fabric layer may be adhered to each other by a method such as thermal lamination or ultrasonic lamination.

According to another embodiment, it is possible to use a method of laminating the film layer and the nonwoven fabric together and then applying the asphalt emulsion thereto by spray coating, or a kiss roll method of applying the asphalt emulsion to a contacted roll and then applying the asphalt emulsion to one surface of the nonwoven fabric by the roll.

In the present invention, the nonwoven fabric layer obtained by impregnating the nonwoven fabric with the asphalt emulsion is used, and thus it may substitute for a conventional tack coat in the asphalt repair process, and may provide sufficient adhesion between the film layer and the reinforcing fiber layer. In addition, the nonwoven fabric containing the asphalt emulsion is disposed between the reinforcing fiber layer and the film layer, and thus when the finished product is stored in a rolled state, it is easily unrolled due to the thickness of the reinforcing fiber layer and the presence of the film layer.

In the conventional asphalt repair process, a tack coat is applied, and then an asphalt reinforcement is applied. When there is a zone in which the reinforcement has not been applied and when a dump truck or the like moves on the exposed tack coat in the zone, the tack coat may adhere to the wheels and the reinforcement in a zone in which the reinforcement has been applied may be damaged by the stickiness of the tack coat. However, the asphalt reinforcement of the present invention eliminates the need to apply the tack coat, and overcomes the above-described problem because the film layer is formed on the nonwoven fabric layer impregnated with the asphalt emulsion. In addition, the film layer may prevent the tack coat from being lost due to rain, snow, etc. during pavement construction, and block the penetration of foreign substances from the external environment.

According to one embodiment of the present invention, the asphalt reinforcement of the present invention may be produced by preparing the reinforcing fiber layer and the film layer composed of a polyethylene film, and then disposing the asphalt emulsion-impregnated nonwoven fabric layer therebetween, followed by lamination using a roller or the like. According to another embodiment, the asphalt reinforcement of the present invention may be produced by laminating the film layer and the nonwoven fabric layer together, and placing the reinforcing fiber layer on the other surface of the nonwoven fabric layer, which is opposite to the film layer, followed by lamination using a roller or the like.

According to one embodiment of the present invention, there is provided a method of repairing asphalt pavement using the asphalt reinforcement according to the present invention. The method includes steps of: (S11) cleaning a surface of an existing base 10 to be repaired; (S12) disposing the asphalt reinforcement 100 according to the present invention; and (S13) paving new asphalt 50 on the asphalt reinforcement.

Hereinafter, each step will be described in detail.

First, the surface of the base 10 to be repaired is cleaned (S11). The surface of a road as the base may include an existing asphalt surface, a cut or flat asphalt surface, a concrete surface, a cut concrete surface, or an iron surface. The step of cleaning the base surface to remove foreign substances is performed to prevent the problem that the adhesion between the new and existing pavement layers is lowered due to foreign substances and the subsequent paving operation becomes inconvenient.

Then, the asphalt reinforcement 100 according to the present invention is applied (S12). The asphalt reinforcement 100 is applied so that reinforcing fiber layer is in contact with the base surface and the film layer faces upward. The asphalt reinforcement contains the asphalt emulsion in the nonwoven fabric layer, and thus eliminates the need for a separate tack coat application or curing process.

Finally, the new asphalt 50 is paved on the asphalt reinforcement (S13). After completion of paving, compaction and curing are performed. The new asphalt is preferably paved to a thickness of 20 to 110 mm, but the thickness may be adjusted depending on road conditions.

Hereinafter, the present invention will be described in more detail with reference to Examples and Comparative Examples, but the scope of the present invention is not limited by these Examples.

Experimental Example 1

To evaluate the curing time of the asphalt emulsion according to the present invention, three different asphalt emulsions having the compositions shown in Table 1 below were prepared and impregnated into nonwoven fabric specimens, followed by a curing test. The results are shown in Table 2 below.

In the evaluation method, 1 liter of each of the emulsions of Example 1 and Comparative Examples 1 and 2 was placed in containers having the same size, and nonwoven fabric specimens having the same basis weight (25 g/m²) and the same size (50 cm×50 cm) were prepared. Each nonwoven fabric specimen was placed in each container and impregnated with each asphalt emulsion for about 30 seconds. Next, the nonwoven fabric specimens were taken out and placed in an environment with a temperature of 25±2° C. and a humidity of 50±10%, and the curing time of each asphalt emulsion was measured.

TABLE 1

|  | Example 1 (wt %) | Comparative Example 1 (wt %) | Comparative Example 2 (wt %) |
|---|---|---|---|
| Modified asphalt (PG76-22) | 65 | 55 | 73 |
| Water | Balance | Balance | Balance |
| Hydrochloric acid | 0.2 | 0.2 | 0.2 |
| Calcium chloride | 0.1 | 0.1 | 0.1 |
| Fatty acid amine salt | 0.1 | 0.1 | 0.1 |
| Glycerin compound and resin acid | 3.0 | 0.5 | 5.5 |

TABLE 1-continued

|  | Example 1 (wt %) | Comparative Example 1 (wt %) | Comparative Example 2 (wt %) |
|---|---|---|---|
| Polyamine (anti-stripping agent) | 0.05 | 0.05 | 0.05 |
| Petroleum resin | 3.0 | 3.0 | 3.0 |
| Latex | 6.0 | 6.0 | 6.0 |
| Methyl cellulose (thickener) | 2.0 | 2.0 | 2.0 |
| Sum | 100 | 100 | 100 |

TABLE 2

|  | Curing time (min) |
|---|---|
| Example 1-1 | 2.50 |
| Example 1-2 | 2.10 |
| Example 1-3 | 2.20 |
| Average of Example 1 | 2.26 |
| Comparative Example 1-1 | 3.75 |
| Comparative Example 1-2 | 3.54 |
| Comparative Example 1-3 | 3.28 |
| Average of Comparative Example 1 | 3.52 |
| Comparative Example 2-1 | 1.52 |
| Comparative Example 2-2 | 1.37 |
| Comparative Example 2-3 | 1.45 |
| Average of Comparative Example 2 | 1.44 |

Referring to Table 1 above, it can be confirmed that the curing time of the asphalt emulsion was 3.52 minutes for Comparative Example 1, but shorter than 2.5 minutes for Example 1.

Experimental Example 2

To evaluate the viscosity of the asphalt emulsion according to the present invention, three different asphalt emulsions having the compositions shown in Table 3 below were prepared and impregnated into nonwoven fabric specimens, followed by a curing test. The results are shown in Table 4 below.

In the evaluation method, the viscosity of each asphalt emulsion was measured using a Brookfield viscometer. In the method and procedure, each liquid sample to be used in the test was placed in a sample chamber, and then aged at 25° C. for 30 minutes. The spindle of the Brookfield viscometer was immersed in the chamber containing each aged sample, and the sample was further aged at 25° C. for 30 minutes. Next, the viscosity value of each sample was measured using the Brookfield viscometer while adjusting the RPM.

TABLE 3

|  | Example 1 (wt %) | Comparative Example 1 (wt %) | Comparative Example 2 (wt %) |
|---|---|---|---|
| Modified asphalt (PG76-22) | 65 | 55 | 73 |
| Water | Balance | Balance | Balance |
| Hydrochloric acid | 0.2 | 0.2 | 0.2 |
| Calcium chloride | 0.1 | 0.1 | 0.1 |
| Fatty acid amine salt | 0.1 | 0.1 | 0.1 |
| Glycerin compound and resin acid | 3.0 | 3.0 | 3.0 |
| Polyamine (anti-stripping agent) | 0.05 | 0.05 | 0.05 |

TABLE 3-continued

|  | Example 1 (wt %) | Comparative Example 1 (wt %) | Comparative Example 2 (wt %) |
|---|---|---|---|
| Petroleum resin | 3.0 | 3.0 | 3.0 |
| Latex | 6.0 | 6.0 | 6.0 |
| Methyl cellulose (thickener) | 2.0 | 0.5 | 12.0 |
| Sum | 100 | 100 | 100 |

TABLE 4

|  | Average viscosity (cP) |
|---|---|
| Example 1-1 | 103 |
| Example 1-2 | 105 |
| Example 1-3 | 101 |
| Average of Example 1 | 103 |
| Comparative Example 1-1 | 56 |
| Comparative Example 1-2 | 49 |
| Comparative Example 1-3 | 52 |
| Average of Comparative Example 1 | 52 |
| Comparative Example 2-1 | 303 |
| Comparative Example 2-2 | 299 |
| Comparative Example 2-3 | 301 |
| Average of Comparative Example 2 | 301 |

Referring to Table 4 above, it can be confirmed that, in the case of Comparative Example 1 in which the content of the thickener was 0.5 wt % and the content of the modified asphalt was 55 wt %, the average viscosity was only 52 cP, and in Comparative Example 2 in which the content of the thickener was 12 wt % and the content of the modified asphalt was 73 wt %, the average viscosity was as high as 301 cP.

Experimental Example 3

In order to evaluate curing of the asphalt emulsion according to the present invention, three different asphalt emulsions having the compositions shown in Table 3 above were prepared and impregnated into nonwoven fabric specimens, followed by a curing test. The results are shown in Table 5 below.

In the evaluation method, the emulsions of Example 1 and Comparative Examples 1 and 2 shown in Table 3 above were used as asphalt emulsions. 50 liters of each emulsion were placed in each bath. The following laminates were prepared: a laminate of a copolyamide-based TBCW (through bonded carded web) non-woven fabric (melting point: 110° C. or lower; 25 g/m²) and a linear low-density polyethylene film (melting point: 110° C.; non-breathable, 20 g/m²); and a laminate of a copolyamide-based TBCW (through bonded carded web) nonwoven fabric (melting point: 110° C. or lower; and 45 g/m²) and a linear low-density polyethylene film (melting point: 110° C.; non-breathable, 20 g/m²). The nonwoven fabric and the film were laminated together to have a width of 1.8 m, and the nonwoven fabric was impregnated with the asphalt emulsion while moving at a speed of 2 m/min by a kiss roll method. During the test, the drying and curing section was 10 m, and in a 2 m section thereof, each asphalt emulsion was dried by heating to a surface temperature of about 100° C.

TABLE 5

| | Example 1-1 | Example 1-2 | Comp. Example 1-1 | Comp. Example 1-2 | Comp. Example 2-1 | Comp. Example 2-2 |
|---|---|---|---|---|---|---|
| Film (g/m$^2$) | 20 | 20 | 20 | 20 | 20 | 20 |
| Nonwoven fabric (g/m$^2$) | 25 | 45 | 25 | 45 | 25 | 45 |
| Asphalt emulsion | Example 1 | Example 1 | Comp. Example 1 | Comp. Example 1 | Comp. Example 2 | Comp. Example 2 |
| Viscosity (cP) | 103 | 103 | 52 | 52 | 301 | 301 |
| Amount impregnated (ml/m$^2$) | 237 | 338 | 42 | 48 | 726 | 794 |
| Curing level | Good | Good | Over-dried (film melted) | Over-dried (film melted) | Not cured | Not cured |
| Use as product | Possible | Possible | Impossible | Impossible | Impossible | Impossible |

Referring to Table 5 above, it can be confirmed that, when the nonwoven fabric was impregnated with the asphalt emulsion of Example 1, the curing level of the emulsion was good, and the impregnated structure was usable as a product. However, it was confirmed that, when the nonwoven fabric was impregnated with the asphalt emulsion of Comparative Example 1, the film and the nonwoven fabric were over-dried to the extent to which the film and the nonwoven fabric were melted during the drying and curing process at 100° C., and commercialization of the impregnated structure was impossible. In addition, it was confirmed that, when the nonwoven fabric was impregnated with the asphalt emulsion of Comparative Example 2, the asphalt emulsion was impregnated into the nonwoven fabric in an excessively large amount due to its excessively high viscosity and was not cured, and commercialization of the impregnated structure was impossible.

Although the present invention has been described in detail with reference to the specific features, it will be apparent to those skilled in the art that this description is only of a preferred embodiment thereof, and does not limit the scope of the present invention. Thus, the substantial scope of the present invention will be defined by the appended claims and equivalents thereto.

DESCRIPTION OF REFERENCE NUMERALS

10: base; 100: asphalt reinforcement; 20: reinforcing fiber layer; 30: adhesive layer (emulsion-impregnated nonwoven fabric layer); 40: film layer; 50: new asphalt.

The invention claimed is:

1. An asphalt reinforcement comprising:
a reinforcing fiber layer having a plurality of holes formed therein;
a film layer, which is breathable or non-breathable, comprises at least one resin selected from the group consisting of polypropylene, polyethylene, ethylene vinyl acetate, polyethylene elastomers, polypropylene elastomers, polybutene, and thermoplastic polyurethane, and has a melting point of 90° C. to 130° C.; and
a nonwoven fabric layer, which is disposed between the reinforcing fiber layer and the film layer, is impregnated with an asphalt emulsion, and has a melting point of 50° C. to 130° C.,
wherein the asphalt emulsion is prepared by mixing a first emulsion and a second emulsion and has a viscosity of 40 to 200 cP, wherein the first emulsion contains modified asphalt, a curing agent, an anti-stripping agent, and petroleum resin, and the second emulsion contains latex, a fatty acid amine salt, calcium chloride, hydrochloric acid, a thickener, and water.

2. The asphalt reinforcement according to claim 1, wherein the nonwoven fabric layer is impregnated with the asphalt emulsion in an amount of 50 to 650 g/m$^2$.

3. The asphalt reinforcement according to claim 1, wherein the asphalt emulsion contains, based on the total weight of the emulsion, 60 to 70 wt % of the modified asphalt, 1.0 to 5.0 wt % of the curing agent, 0.01 to 0.1 wt % of the anti-stripping agent, 0.1 to 5.0 wt % of petroleum resin, 5.0 to 10.0 wt % of latex, 0.1 to 2.0 wt % of the fatty acid amine salt, 0.1 to 2.0 wt % of calcium chloride, 0.1 to 1.0 wt % of hydrochloric acid, 1.0 to 10.0 wt % of the thickener, and 20 to 30 wt % of water.

4. The asphalt reinforcement according to claim 1, wherein the film layer has a basis weight of 10 to 50 g/m$^2$, and the nonwoven fabric layer comprises polyethylene spunbond nonwoven fabric, polyethylene melt-blown nonwoven fabric, copolyamide TBCW nonwoven fabric, copolyamide melt-blown nonwoven fabric, polypropylene TBCW nonwoven fabric, polypropylene melt-blown nonwoven fabric, ethylene vinyl acetate TBCW nonwoven fabric, or ethylene vinyl acetate melt-blown nonwoven fabric, and has a basis weight of 10 to 50 g/m$^2$.

5. The asphalt reinforcement according to claim 1, wherein, when the film layer is breathable, it comprises at least one resin selected from the group consisting of polypropylene, polyethylene, ethylene vinyl acetate, polyethylene elastomers, polypropylene elastomers, polybutene, and thermoplastic polyurethane, and at least one inorganic material selected from the group consisting of calcium carbonate, magnesium carbonate, magnesium sulfate, barium sulfate, magnesium sulfate, zeolite, talc, kaolin, zinc oxide, titanium dioxide, alumina, aluminum hydroxide, magnesium hydroxide, diatomaceous earth, and clay.

6. The asphalt reinforcement according to claim 1, wherein the reinforcing fiber layer is a grid network comprising at least one fiber selected from the group consisting of carbon fibers, glass fibers, basalt fibers, Kevlar fibers, aramid fibers, and polyester fibers.

7. A method for repairing asphalt pavement comprising steps of:
cleaning a surface of a base to be repaired;
disposing the asphalt reinforcement according to claim 1;
paving asphalt on the asphalt reinforcement; and
compacting and curing.

8. A method for repairing asphalt pavement comprising steps of:
cleaning a surface of a base to be repaired;
disposing the asphalt reinforcement according to claim 2;
paving asphalt on the asphalt reinforcement; and
compacting and curing.

9. A method for repairing asphalt pavement comprising steps of:

cleaning a surface of a base to be repaired;
disposing the asphalt reinforcement according to claim 3;
paving asphalt on the asphalt reinforcement; and
compacting and curing.

10. A method for repairing asphalt pavement comprising steps of:
cleaning a surface of a base to be repaired;
disposing the asphalt reinforcement according to claim 4;
paving asphalt on the asphalt reinforcement; and
compacting and curing.

11. A method for repairing asphalt pavement comprising
steps of:
cleaning a surface of a base to be repaired;
disposing the asphalt reinforcement according to claim 5;
paving asphalt on the asphalt reinforcement; and compacting and curing.

12. A method for repairing asphalt pavement comprising
steps of:
cleaning a surface of a base to be repaired;
disposing the asphalt reinforcement according to claim 6;
paving asphalt on the asphalt reinforcement; and
compacting and curing.

* * * * *